Patented Sept. 20, 1949                                              2,482,311

UNITED STATES PATENT OFFICE 2,482,311

PROCESS FOR THE TREATMENT OF VANADIUM-BEARING ORES

Ragnvald Asak, Vestre Aker, near Oslo, Norway, assignor to Christiania Spigerverk, Nydalen, near Oslo, Norway No Drawing. Application March 29, 1946, Serial No. 658,203. In Norway July 1, 1939

Section 1, Public Law 690, August 8, 1946
Patent expires July 1, 1959

1 Claim. (Cl. 23—15)

The present invention relates to a process for the treatment of vanadium-bearing iron ores and in particular to an improved method of freeing the vanadium from its spinel-like association with the iron by heating the ore in a porous state with reducing carbon to reduce only the iron and subsequently to oxidize both iron and vanadium to leachable vanadate.

It is formerly known to roast vanadium-bearing ores, for example titanium-bearing iron ores in the presence of alkali compounds, for example soda, sodium chloride or nitrate or mixtures thereof, whereby alkali vanadate is obtained, which is lixiviated.

However, none of these processes are workable in practise when the vanadium content is low, for example 1%. Besides, sticking during the roasting cannot be avoided, which causes breakdowns and excessive wear and tear of the machinery and the furnaces and consequently increased repair costs. Further, the roasting air will not penetrate to the grains through the sticking layer, with resulting incomplete oxidation.

The drawbacks referred to above are obviated by the present invention.

According to the invention the ground ore together with an alkali compound is mixed with a carbonaceous material, for example charcoal, coke or coke breeze.

Thus heat is supplied to the material in a very convenient manner for the desired reactions, and simultaneously the mixture becomes more porous, thereby facilitating the admission of air and the oxidation of the lower oxides in the oxidation step. The carbonaceous material may be added before or during the roasting operation. At the preliminary reduction which occurs on introducing air, part of the carbon has a reducing effect on the iron oxide, while the vanadium oxide is not reduced, but is liberated from its spinel-like compound with the iron and possible other metals which may be present.

In the subsequent oxidation step the admission of air is controlled in such a way, that the vanadium is oxidised to a higher oxide, which combines with the alkali to alkali vanadate, while simultaneously the lower iron oxides or iron metal obtained by the reduction are oxidised to $Fe_2O_3$. The alkali vanadate is washed out and the solution further treated in a manner known per se.

In case the process is used in connection with an ore of such a kind that also the iron and in case the titanium content of the ore should be utilised, the roasted and lixiviated material, which is free of sulphur, may be subjected to a reducing treatment, whereby the iron oxide is reduced to metal, eventually in blast furnaces or electric pig iron furnaces. After lixiviation, the iron sponge may then be separated magnetically. From the solution and residue vanadic acid and titanium compounds, for instance, titanic acid, are then reduced in a manner known per se.

Some roasting tests with vanadium bearing iron ore with or without additions of charcoal or coke breeze are reported below.

Table I

Roasting tests with vanadium bearing iron ore without addition of charcoal, coke breeze or the like.

[The tests were effected in an electrically heated furnace.]

| Grain size | Percent NaCl | Percent $Na_2SO_4$ | Percent $KNO_3$ | Temp., Degree C. | Roasting time, hours | Percent Yield |
|---|---|---|---|---|---|---|
| 25% between 100 and 200 mesh | 10 | | | 800 | 4½ | 52 |
| 75% finer than 200 mesh | 14 | | | 800 | 4½ | 43.4 |
| Do | 17 | | | 800 | 4½ | 41.7 |
| Do | 20 | | | 800 | 4½ | 48.7 |
| Do | 20 | | | 800 | 4½ | 41.2 |
| Do | 20 | | 5 | 800 | 4½ | 36.2 |
| Do | 15 | | 5 | 800 | 4½ | 32.4 |
| Do | 13 | | 5 | 800 | 4½ | 33.8 |
| Do | 10 | | 5 | 800 | 4½ | 38.2 |
| Do | | 10 | | 800 | 4½ | 58.8 |
| Do | 4 | 5 | | 800 | 4½ | 67.5 |
| Do | 4 | 5 | | 850 | 4½ | 65.0 |
| Do | 4 | 5 | | 900 | 4½ | 65.8 |
| Do | 4 | 5 | | 950 | 4½ | 64.2 |
| Do | 10 | | | 850 | 4½ | 65.9 |
| Do | 15 | | | 850 | 4½ | 65.9 |
| Do | 20 | | | 850 | 4½ | 64.5 |
| Do | 10 | | 5 | 850 | 4½ | 65.0 |
| Do | 15 | | 5 | 850 | 4½ | 66.0 |
| Do | 20 | | 5 | 850 | 4½ | 65.2 |
| Do | 10 | | | 850 | 4½ | 68.5 |
| Do | 20 | | | 850 | 4½ | 68.0 |
| Finer than 200 mesh | | | | 800 | 4½ | 65.2 |
| Do | | 20 | | 850 | 4½ | 68.8 |
| Do | | 15 | | 850 | 4½ | 60.0 |
| Do | | 10 | | 850 | 4½ | 58.4 |
| Do | | 8 | | | | |
| Do | | | | | | |

Table II

Roasting test with vanadium bearing iron ore with added coke breeze or charcoal.

| Grain size | Per cent soda | % charcoal | Per cent coke breeze | Roasting time, hours | Per cent yield of vanadium |
|---|---|---|---|---|---|
| 100 mesh | 20 | 10 | | 2½ | 95.3 |
| Do | 20 | 10 | | 2½ | 92.3 |
| Do | 20 | 10 | | 2½ | 92.5 |
| Do | 15 | 10 | | 2½ | 94.8 |
| Do | 15 | 10 | | 2½ | 100.0 |
| Do | 15 | 10 | | 2½ | 94.0 |
| Do | 15 | | 10 | 2½ | 94.0 |
| Do | 15 | | 10 | 2½ | 94.5 |
| Do | 15 | | 20 | 2½ | 90.0 |
| Do | 10 | | 20 | 2½ | 92.3 |
| Do | 10 | | 10 | 2 | 95.0 |
| Do | 8 | | 10 | 2 | 93.0 |
| Do | 5 | | 10 | 2 | 91.0 |

In the tests in Table I the roasting product agglomerated or coalesced strongly and the vanadium yield did not exceed 70%, even with ore ground down to a grain size finer than 200 mesh.

As being evident from Example II an addition of coke breeze or charcoal to the roasting material results in an increased vanadium yield of from about 70%–about 95% in using a shorter roasting time even with less finely ground ore, sticking being simultaneously prevented, whereby it becomes possible to undertake the roasting in rotating furnaces, step grate furnaces, etc.

It will be noted from the second example above performed upon a typical vanadium containing iron ore the optimum quantity of each of soda and charcoal may be in the range of 10%–15% with respect to the ore.

I claim:

Process of producing soluble vanadium compounds from vanadium bearing iron ores comprising mixing the granulated ore with an alkali metal compound in quantity sufficient to react with the vanadium oxide content of the ore and a porous carbon material selected from the group consisting of charcoal and coke and heating the mixture first with a limited supply of air to effect a preliminary reduction of the metal content of the ore other than vanadium to free the unreduced vanadium oxide from its spinel-like compound with the iron, then heating the mixture with a free supply of air to oxidize both the vanadium to its higher oxide to form vanadates by reaction with the alkali compound and the iron to iron oxide ($Fe_2O_3$), and leaching the soluble vanadate from the ore.

RAGNVALD ASAK.

REFERENCES CITED

The following references are of record in the file of this patent:

UNITED STATES PATENTS

| Number | Name | Date |
|---|---|---|
| 831,280 | Handy | Sept. 18, 1906 |
| 1,513,200 | Udy | Oct. 28, 1924 |
| 1,521,607 | Dixon | Jan. 6, 1925 |
| 1,554,917 | Kunkle | Sept. 22, 1925 |
| 1,691,274 | Flodin | Nov. 13, 1928 |
| 1,834,236 | Champagne | Dec. 1, 1931 |
| 2,238,673 | Asak | Apr. 15, 1941 |

FOREIGN PATENTS

| Number | Country | Date |
|---|---|---|
| 442,853 | Great Britain | May 15, 1934 |